United States Patent [19]

Kohli

[11] Patent Number: 5,786,286
[45] Date of Patent: Jul. 28, 1998

[54] GLASS CERAMIC REAR PANEL FOR EMISSIVE DISPLAY

[75] Inventor: Jeffrey T. Kohli, Corning, N.Y.

[73] Assignee: Corning Incorporated, Corning, N.Y.

[21] Appl. No.: 824,740

[22] Filed: Mar. 26, 1997

Related U.S. Application Data

[63] Continuation of Ser. No. 640,609, May 1, 1996, abandoned.

[60] Provisional application No. 60/008,149 Oct. 31, 1995.

[51] Int. Cl.$^6$ .................................................. C03C 10/06
[52] U.S. Cl. .................................................. 501/8; 501/69
[58] Field of Search ............................ 501/8, 32, 69

[56] References Cited

U.S. PATENT DOCUMENTS

| | | | |
|---|---|---|---|
| 2,691,855 | 10/1954 | Armistead | 49/92 |
| 2,920,971 | 1/1960 | Stookey | 106/39 |
| 3,272,610 | 9/1966 | Eppler et al. | 65/33 |
| 3,531,303 | 9/1970 | Bahat | 106/39 |
| 3,837,978 | 9/1974 | Busdiecker | 161/1 |
| 4,853,349 | 8/1989 | Martin | 501/8 |
| 5,459,109 | 10/1995 | Lapp | 501/66 |
| 5,489,558 | 2/1996 | Moffatt et al. | 501/69 |
| 5,508,237 | 4/1996 | Moffatt et al. | 501/69 |
| 5,599,754 | 2/1997 | Maeda et al. | 501/70 |
| 5,631,195 | 5/1997 | Yanagisawa et al. | 501/72 |
| 5,658,835 | 8/1997 | Onitani et al. | 501/9 |

OTHER PUBLICATIONS

A. Bandyopadhyay, S.W. Quander, P.B. Aswath, D.W. Freitag, K.K. Richardson, D.L. Hunn, "Kinetics of In–situ α to β $Si_3N_4$ Transformation in a Barium Aluminosilicate Matrix", Scripta Metallurgica et Materialia, vol. 32, No. 9, pp. 1417–1422, no date.

A. Bandyopadhyay, P.B. Aswath, W.D. Porter, O.B. Cavin, "The low temperature hexagonal to orthorhobmic transformation in $Si_3N_4$ reinforced BAS matrix composites", J. Mater. Res., vol. 10, No. 5, May 1995 pp. 1256–1263.

B. Yoshiki, K. Matsumoto, "High–Temperature Modification of Barium Feldspar", Research Laboratory, Asahi Glass Company, Yokohama, Japan, no date.

*Primary Examiner*—Karl Group
*Attorney, Agent, or Firm*—Robert L. Carlson

[57] ABSTRACT

An electronic display having a ceramic or glass-ceramic rear substrate panel therein. The use of ceramic or glass-ceramic materials for the rear panel substrate enables the use of thinner substrate panels, as well as increased strength, toughness, and hardness compared to substrates of the prior art.

10 Claims, No Drawings

GLASS CERAMIC REAR PANEL FOR EMISSIVE DISPLAY

This is a continuation of application Ser. No. 08/640,609, filed May 1, 1996 now abandoned.

This application claims the benefit of the priority date of United States Provisional application No. 60/008,149, filed Oct. 31, 1995.

FIELD OF THE INVENTION

This invention relates to emissive displays, more particularly materials for use in the rear or back panel of such displays.

BACKGROUND OF THE INVENTION

Emissive displays include a wide variety of displays, including plasma displays (PDP's) and field emission displays (FED's), in which light is emitted to create a color image. PDPs belong to a broad classification of displays known as vacuum fluorescent displays. The mechanism underlying their operation is similar to that operating in fluorescent lighting. That is, an electrical discharge is initiated in a gas mixture (Penning gas) at low pressure, this discharge ionizing the gas atoms releasing ultraviolet radiation which strikes a phosphor emitting visible light. Where color is desired, phosphors which emit red, blue, and green light upon being struck by the ultraviolet energy are used.

Plasma displays can be classified broadly into one of three types, depending upon the type of voltage utilized to address the display. Thus, there are DC displays, AC displays, and hybrid displays, the last type comprising a AC-DC mode of display. Each type exhibits its own advantages and disadvantages; for example, ease of manufacture (DC type) or improved efficiency (AC type). The principal substantive difference between those displays resides in the method by which the current is limited to prevent arcing of the Penning gas. In the DC panel this is accomplished through the incorporation of an external resistor which is in series with the anode. In the AC and hybrid display panels this is accomplished by employing a thin dielectric glass layer which is applied as a coating on both electrodes.

A PDP panel is typically composed of two flat glass sheets, each having a thickness of about 2–3 mm and spaced about 100–150 μm apart. Barrier ribs, commonly consisting of a glass frit screen printed onto the rear glass panel, define this gap as well as the individual subpixels. The electrodes are located on the interior surface of these glass sheets. In the simplest case the electrodes are arranged parallel to and facing one another on each sheet, the electrodes on each sheet aligned orthogonally with respect to electrodes on the other sheet. Typical electrode materials include Cu/Cr and Ag which are applied as a paste frit.

In both the AC and AC-DC hybrid type of display panels an appropriately doped dielectric glass frit (which is highly reflective when applied on the back surface and highly transparent layer when applied on the front) covers the electrodes, and these dielectric layers are then in turn covered with a sputtered MgO layer. This MgO layer serves both as a protector of the underlying layers and a low energy source of electrons which assist in sustaining the plasma. A final layer is put in place which comprises an appropriate fluorescent material applied over the MgO.

The elements that are deposited upon the rear panel are generally "fired" (i.e. sintered or bonded at high temperature) in a series of sequential heat treatments which fix the active and inactive materials used for defining an array of pixels. The precise development of a pixel array is designed to yield a display having a high resolution. The registration or alignment of pixels is undesirably altered over time if the substrate compacts, warps, or otherwise changes dimension as a result of thermal cycling. Unfortunately, glass can compact or shrink at elevated temperatures, due to structural densification, even when processed below the strain point of the glass. Long term annealing or compaction processes may be used to stabilize glass against thermal cycling, but this adds significant cost and processing time.

SUMMARY OF THE INVENTION

In the present invention, the rear panel of the emissive display is formed from a ceramic or glass-ceramic material, rather than glass. Preferably, the ceramic or glass-ceramic rear panel of the present invention has a coefficient of thermal expansion (CTE) of approximately $75-90\times10^{-7}/°C$., more preferably $78-85\times10^{-7}/°C$. over the temperature range from room temperature to 300° C. It is also preferable that the strain point of the substrate in such back panels be greater than 600° C., more preferably in excess of 700° C., and most preferably greater than 800° C.

One preferred family of glass-ceramic materials has the following composition, in weight percent: 35–55% $SiO_2$, 5–25% $Al_2O_3$, 5–25% MgO, 5–35% BaO, 6–14% $TiO_2$, 0–10% ZnO. More preferred glass-ceramic substrates have a weight percent composition in the range of 40–50% $SiO_2$, 8–20% $Al_2O_3$, 10–24% MgO, 8–22% BaO, 8–12% $TiO_2$, 0–6% ZnO. The preferred glass-ceramic substrates in accordance with the invention have a primary crystal phase which is a hexagonal sheet structure characteristic of hexacelsian (e.g. a solid solution of hexacelsian). A preferred secondary crystal phase is enstatite. When such crystal phases are present, the glass-ceramic exhibits a more stabilized thermal expansion. This stabilization is at least partially facilitated by substituting Mg or Zn or other ions into the hexacelsian structure.

The ceramic and glass-ceramic back panels of the present invention have a number of advantages over the glass back panels of the prior art. For example, the materials of the present invention are substantially more rigid than glass, thereby enabling the use of thinner panels in the displays.

Other advantages that glass-ceramics have compared to glass include: increased strength, toughness, and hardness; all of which yield a material which is more resistant to handling damage. Another advantage of glass-ceramic materials is that their chemical durability is generally superior to glass. Various acidic and basic solutions are used in the manufacture of emissive displays, e.g. in conjunction with lithographic processes, therefore it is useful to have a substrate material that is inert or relatively unaffected by these solutions.

In addition, ceramic or glass-ceramic rear panels are generally more resistant to thermal cycling and, being more resistant to thermal shrinkage, behave in a more controlled and predictable manner at elevated temperatures.

In a preferred embodiment of the invention, the glass-ceramic material is formed using a float process. However, the invention is not limited to this forming method, and other forming methods, e.g. rolled sheet forming, could also be employed.

DETAILED DESCRIPTION OF THE INVENTION

In the present invention, the rear panel of the emissive display is formed from a ceramic or glass-ceramic material, rather than glass. The front panel must be transparent so that an image may be transmitted to the device user. However, the back plate need not be highly transmissive to visible light.

Preferred ceramic or glass-ceramic materials of the present invention have a coefficient of thermal expansion (CTE) of approximately 78–90×10$^{-7}$/°C. over the temperature range from room temperature (25° C.) to 300° C. It would also be desirable to have the strain point of such back panels greater than 600° C., more preferably in excess of 700° C., and most preferably in excess of 800° C.

One preferred family of glass-ceramic materials capable of meeting these requirements has the following composition, in weight percent: 35–55% $SiO_2$, 5–25% $Al_2O_3$, 5–25% MgO, 5–35% BaO, 6–14% $TiO_2$, 0–10% ZnO. More preferred glass-ceramic substrates have a weight percent composition in the range of 40–50% $SiO_2$, 8–20% $Al_2O_3$, 10–24% MgO, 8–22% BaO, 8–12% $TiO_2$, 0–6% ZnO. The most preferred glass-ceramic materials in these compositional ranges are those having a primary crystal phase with a hexagonal sheet structure characteristic of hexacelsian. This primary crystal phase may be in the form of a solid solution of hexacelsian. A preferred secondary crystal phase is enstatite. When such crystal phases are present, the glass-ceramic exhibits a more stabilized thermal expansion. Such stabilization is believed to be facilitated by substituting a Mg or Zn ion into the hexacelsian crystal structure.

Glass-ceramic articles are generally prepared in three basic steps: (1) a glass-forming batch, normally containing a nucleating agent, is melted; (2) the resultant melt is shaped into an article and cooled to a temperature below the transformation range of the glass; and (3) the glass article is heat treated at temperatures above the annealing point of the glass, and often above the softening point of the glass, for a sufficient time to cause the glass to crystallize to some extent. The heat treatment can be scheduled so as to control the size and, in some instances, the identity of the crystals developed. Therefore, the crystal structures present in a glass-ceramic article is the result of both the base chemical composition of the precursor glass as well as the heat treatment the glass body is exposed to.

The ideal thermal expansion curve (plotted as the change in dimension versus temperature) for the materials of the present invention is one which is essentially a straight line, or is monotonic, having as little change in slope as possible. Such a stabilized thermally controlled dimensional expansion enables use of the material in a broader range of applications and enables the material to be in contact with or bonded to other materials and substances throughout a larger temperature range. Further, a stabilized thermal expansion helps to prevent cracking of the glass-ceramic due to dilatation or compaction. A glass-ceramic or ceramic having a non-stabilized thermal expansion is more prone to structural failure due to a phase transformation.

Glass-ceramic articles containing hexacelsian have been discussed in the past as evidenced by U.S. Pat. No. 4,360,567 (Guillevic) and U.S. Pat. No. 3,272,610 (Eppler et al.), the specifications of which are hereby incorporated by reference. "Compositional Study and Properties Characterization of Alkaline Earth Feldspar Glasses and Glass-Ceramics" by Dov Bohat, published in Vol. 4 (1969) of the *Journal of Materials Science*, pp. 855–860 and "Transmission Electron Microscopy of $SrAl_2Si_2O_8$: Feldspar and hexacelsian polymorphs" by Jutta Topel-Schadt et al., published in Vol 13 (1978) of the *Journal of Materials Science*, pp 1809–1815 further disclose the hexacelsian crystal structure.

To form the preferred glass-ceramic sheets in accordance with the present invention, a glass batch of the desired composition is formulated, mixed and melted. The resultant glass melt is formed into a glass shape of a predetermined configuration utilizing conventional glass forming techniques (e.g. float glass manufacturing or rolled glass sheet manufacturing). Once the glass shape is formed, it is heat treated in accordance with a pre-designed schedule to induce nucleation and growth of crystals on these nuclei. Thereafter, where necessary, the crystallized article is finished to precise dimensions and desired surface texture. For the preferred compositions listed hereinabove, the preferred nucleating agent is titania ($TiO_2$) with the nucleating crystal believed to be magnesium dititanate ($MgTi_2O_5$). Zirconia ($ZrO_2$) and/or other nucleating agents (such as, for example, silver) may be used in place of titania, but titania is preferred. These glass-ceramics can be formed from the parent glass using a variety of conventional techniques including pressing, spinning, and casting into large or small articles that are free from unwanted opalization and devitrification, even when cooled under relatively slow conditions. Glass batches representative of the above compositional ranges were melted at a temperature of about 1450°–1600° C. for a duration of approximately 6–16 hours, resulting in transparent, brown glasses. Thereafter these precursor glasses were subjected to a ceramming heat treatment in which they were held at a temperature of 800° C. for approximately two hours to induce nucleation. Then, to promote the growth of crystals on these nuclei, the temperature was raised up into the range of 925° C. to 1025° C. and held for approximately two to four hours.

These compositions and heating procedures result in crystallized glass articles having primary crystal phases with the hexagonal sheet structure indicative of hexacelsian. The crystallization is preferably greater than 50% with an optimal crystallization percentage of 70% or greater.

The compositional ranges of Table I and Table II are a result of extensive investigations of the invention as disclosed in Tables III–VII. Table I discloses the compositional ranges of the invention in both weight % and mole % which are suitable for use as back panel substrates for emissive displays. Table II discloses the preferred compositional ranges of the invention which are particularly useful in the manufacturing of back panel substrates for emissive displays.

TABLE I

Composition Ranges of the Invention

|  | Weight % | Mole % |
|---|---|---|
| $SiO_2$ | 35–55% | 40–60% |
| $Al_2O_3$ | 5–25% | 5–15% |
| MgO | 5–25% | 10–35% |
| BaO | 5–35% | 2–18% |
| $TiO_2$ | 6–14% | 5–12% |
| ZnO | 0–10% | 0–8% |
| Optional ingredients of CaO, SrO, $B_2O_3$ in total % | 0–15% | 0–10% |

TABLE II

Preferred Composition Ranges of the Invention

|  | Weight % | Mole % |
|---|---|---|
| $SiO_2$ | 40–50% | 48–52% |
| $Al_2O_3$ | 8–20% | 6–12% |
| MgO | 10–24% | 20–30% |
| BaO | 8–22% | 4–11% |
| $TiO_2$ | 8–12% | 8–10% |
| ZnO | 0–6% | 0–5% |
| Optional ingredients of CaO, SrO, $B_2O_3$ in total % | 0–10% | 0–5% |

Table III discloses the weight % of Samples A–N of this invention. These compositions are presented in approximate weight percent. Batches corresponding to Samples A–N were formulated using standard batch materials, and then melted at approximately 1500°–1600° C. for approximately 6–16 hours. These glass melt compositions of Samples A–N resulted in transparent, brown/amber glasses having compositions corresponding to their respective batch compositions. Table IV presents the compositional information of Table III's Samples A–N in mole percent.

TABLE III

Compositions by Weight % of Samples Melted at 1600° C. for 16 Hours Resulting in Transparent Brown Glass

| Wt % | A | B | C | D | E | F | G |
|---|---|---|---|---|---|---|---|
| $SiO_2$ | 42 | 41.5 | 42.6 | 43.3 | 41.9 | 42.5 | 45.3 |
| $Al_2O_3$ | 14.2 | 18.3 | 14.5 | 14.7 | 14.2 | 14.4 | 11.0 |
| MgO | 11.3 | 10 | 12 | 12.8 | 11.3 | 11.4 | 16.8 |
| BaO | 21.4 | 19.1 | 19.6 | 17.7 | 21.4 | 17.4 | 11.8 |
| ZnO | 1.1 | 1.1 | 1.1 | 1.2 | 0 | 1.2 | 3.76 |
| $TiO_2$ | 10 | 10 | 10.2 | 10.3 | 11.2 | 10.2 | 11.1 |

| Wt % | H | I | J | K | L | M | N | O |
|---|---|---|---|---|---|---|---|---|
| $SiO_2$ | 45.1 | 34.9 | 39.7 | 43.2 | 46.3 | 46 | 48 | 43.3 |
| $Al_2O_3$ | 10.9 | 19.3 | 15.5 | 13.2 | 11 | 11.2 | 11.4 | 13.0 |
| MgO | 16.6 | 7.6 | 11.7 | 13.3 | 17.4 | 18.3 | 19.3 | 13.8 |
| BaO | 11.7 | 29.1 | 23.2 | 19.9 | 14.2 | 12 | 9.8 | 17.8 |
| ZnO | 4.98 | 0 | 0 | 0 | 0 | 1.3 | 0 | 1.18 |
| $TiO_2$ | 11 | 9.1 | 9.9 | 10.4 | 11.1 | 11.2 | 11.5 | 10.4 |

TABLE IV

Compositions by Mole % of Samples Melted at 1600° C. for 16 Hours

| Mole % | A | B | C | D | E | F | G |
|---|---|---|---|---|---|---|---|
| $SiO_2$ | 50.0 | 50.0 | 50.0 | 50.0 | 50.0 | 50.0 | 48.9 |
| $Al_2O_3$ | 10.0 | 13.0 | 10.0 | 10.0 | 10.0 | 10.0 | 7.0 |
| MgO | 20.0 | 18.0 | 21.0 | 22.0 | 20.0 | 20.0 | 27.0 |
| BaO | 10.0 | 9.0 | 9.0 | 8.0 | 10.0 | 8.0 | 5.0 |
| ZnO | 1.0 | 1.0 | 1.0 | 1.0 | 0.0 | 1.0 | 3.0 |
| $TiO_2$ | 9.0 | 9.0 | 9.0 | 9.0 | 10.0 | 9.0 | 9.0 |

| Mole % | H | I | J | K | L | M | N | O |
|---|---|---|---|---|---|---|---|---|
| $SiO_2$ | 49.0 | 46.0 | 48.0 | 50.0 | 50.0 | 49.0 | 50.0 | 49.7 |
| $Al_2O_3$ | 7.0 | 15.0 | 11.0 | 9.0 | 7.0 | 7.0 | 7.0 | 8.8 |
| MgO | 26.0 | 15.0 | 21.0 | 23.0 | 28.0 | 29.0 | 30.0 | 23.6 |
| BaO | 5.0 | 15.0 | 11.0 | 9.0 | 6.0 | 5.0 | 4.0 | 8.0 |
| ZnO | 4.0 | 1.0 | 1.0 | 1.0 | — | 1.0 | 1.0 | 1.0 |
| $TiO_2$ | 9.0 | 9.0 | 9.0 | 9.0 | 9.0 | 9.0 | 9.0 | 9.0 |

All of the above samples have SrO present as an impurity in an amount less than about 0.2 mole percent. Test pieces of glass Samples A–N were subjected to a ceramming heat treatment nucleation phase in which the test pieces were held at approximately 800° C. for approximately 2 hours. This nucleation phase allows for the creation of nuclei which will then promote subsequent crystal growth during the remaining ceramming heat treatment. It is believed that the nucleating crystal of the present invention is magnesium dititanate ($MgTi_2O_5$) when the preferred nucleating agent of titania is used. Subsequent to the nucleation phase, test pieces of Samples A–N were subjected to a four hour period in which crystal growth occurred at temperatures ranging from 925° C. to 1025° C. These ceramming heat treatment schedules are presented in Table V as Schedules 1–6. For example, Schedule 3 subjected the test pieces of glass to a nucleation phase of 800° C. for two hours and then a crystal growing phase of 1025° C. for 4 hours.

TABLE V

Ceramming Process and Resulting Crystal Glass-Ceramic Phase and Appearance

| Schedule | Ceram Cycle: Nucleationl Growth (°C.-hr/°C.-hr) | A | B | C | D | E | F |
|---|---|---|---|---|---|---|---|
| 1 | 800–2/9254 | H/A-W | — | H/G-A | — | H/A | H/W-C |
| 2 | 800–2/9754 | H/A-W | H/A-W | — | H/A | — | — |
| 3 | 800–2/1025-4 | H/W | H/W | — | H/A | — | — |

| Schedule | Nucleationl Growth (°C.-hr/°C.-hr) | G | H | I | J | K | L |
|---|---|---|---|---|---|---|---|
| 4 | 800/2/925-4 | Cr-W | Cr-W | H/A | H, E/G | H, E/G | — |
| 5 | 800/2/950-4 | — | — | — | — | H, E/G-A | — |
| 6 | 800-2/975-4 | Cr-W | Cr-C | H/W | H, E/A-W | H, E/A-W | E/M/G |

Major Phase(s)/Appearance:
H = hexacelsian, E = enstatite, M = mangesium dititanate/G = glassy, A = adamantine, W = waxy, C-cherty, Cr = cracked Table V discloses the major crystal phases present in the glass-ceramics that resulted from subjecting glass Samples A–N to the various ceramming Schedules 1–6. Along with disclosing the resultant major crystal phases of hexacelsian, enstatite, and magnesium dititanate present in the various glass-ceramics Samples A–N, Table V also discloses the appearance of the glass-ceramic in terms of the characteristics of glassy, adamantine, waxy, cherty, or cracked. The term Major Phase(s) used in Table V indicates that the particularly listed crystal phases are present in a significantly greater amount than any of the other accessory crystal phases which may be exhibited by the inventive glass-ceramic. The stabilized hexacelsian crystal phase is the primary crystal phase in that it predominates over the secondary crystal phase of enstatite.

In order to use thinner glass sheet dimensions, the glass-ceramic substrates must demonstrate good strength, toughness, elastic modulus, hardness and appropriate thermal expansion, in addition to having a fine microstructure. Tables VI and VII present the values of these properties for Samples A, C, E, and M. Samples A, C, and E were cerammed using Schedule 1 in Table V, while Sample M were cerammed using Schedule 5 in Table V. The modulus of rupture of an abraded sample, fracture, toughness, elastic or Young's modulus, and linear coefficient of thermal expansion (over the temperature range 25°–300° C.) of these samples were measured and are shown in Table VI.

TABLE VI

Physical Properties of Selected Glass-Ceramics from

|  | A | C | E | K |
|---|---|---|---|---|
| MOR Abraded (kpsi) | 12.2 | 10.1 | 11.5 | 13.8 |
| $K_{IC}$ (MPa · m$^{1/2}$) | 1.17 | 1.24 | — | 1.4 |
| Knoop Hardness (KHN) | 711 | 740 | 675 | 783 |
| Young's Modulus (E-modulus × 10$^6$ psi) | 16.2 | 17.3 | 15.8 | 18.3 |
| CTE × 10$^{-7}$/°C. (at 300° C.) | 7.9 | 78 | — | 84 |

The glass-ceramics listed above exhibit extremely high strain points. For example, composition M resulted in a strain point greater than 900° C., and composition O resulted in a strain point of 1012° C., thus verifying that strain points of greater than 900, and even greater than 1000, are possible with the compositions of the present invention.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A substrate for an emissive display comprising a glass ceramic, exhibiting a coefficient of thermal expansion (CTE) of approximately 78–88×10$^{-7}$/°C. over the temperature range from 25° to 300° C., and consisting essentially of a composition within the following range, expressed in weight percent 35–55% $SiO_2$, 5–25% $Al_2O_3$, 5–25% MgO, 5–35% BaO, 6–14% $TiO_2$, 0–10% ZnO, said glass-ceramic exhibiting at 50 percent crystallization and having a primary crystal phase with a hexagonal sheet structure characteristic of hexacelsian.

2. The substrate of claim 1, wherein said substrate exhibits substantially monotonic thermal expansion curve.

3. The substrate of claim 1, wherein said substrate comprises a glass-ceramic having a strain point greater than 600° C.

4. The substrate of claim 1, wherein said substrate has a strain point greater than about 700° C.

5. The substrate of claim 1, wherein said substrate comprises a glass-ceramic having a composition within the following range, expressed in weight percent: 40–50% $SiO_2$, 8–20% $Al_2O_3$, 10–24% MgO, 8–22% BaO, 8–12% $TiO_2$, 0–6% ZnO.

6. The substrate of claim 1, wherein said substrate has a Young's Modulus in excess of 15 Mpsi.

7. The substrate of claim 1, wherein said substrate has a fracture toughness in excess of 1.1 Mpa·m1/2.

8. The substrate of claim 1, wherein said substrate has a Knoop hardness in excess of 600 (100 g load).

9. The substrate of claim 1, wherein said substrate has a specific Modulus (Y. mod./density) in excess of 4.5.

10. The substrate of claim 1, wherein said material is manufactured via the float glass manufacturing process.

* * * * *